April 27, 1965  J. SCHLICHTHÖRLEIN  3,180,227
GEAR TEETH FINISHING
Original Filed July 11, 1955  7 Sheets-Sheet 1

$$\Delta_1 = \frac{c}{e}$$

$$\Delta_2 = \frac{e_{K1}}{e}$$

$$\Delta_3 = \frac{t_g}{e} = \frac{1}{\varepsilon}$$

INVENTOR.
JOHANN SCHLICHTHÖRLEIN
BY
McGlew & Toren
ATTORNEYS

April 27, 1965  J. SCHLICHTHÖRLEIN  3,180,227
GEAR TEETH FINISHING
Original Filed July 11, 1955  7 Sheets-Sheet 2

INVENTOR.
JOHANN SCHLICHTHÖRLEIN
BY
McGlew & Toren
ATTORNEYS.

INVENTOR.
JOHANN SCHLICHTHÖRLEIN
BY
McGlew & Toren
ATTORNEYS.

April 27, 1965 J. SCHLICHTHÖRLEIN 3,180,227
GEAR TEETH FINISHING
Original Filed July 11, 1955

INVENTOR.
JOHANN SCHLICHTHÖRLEIN
BY
McGlew & Toren
ATTORNEYS.

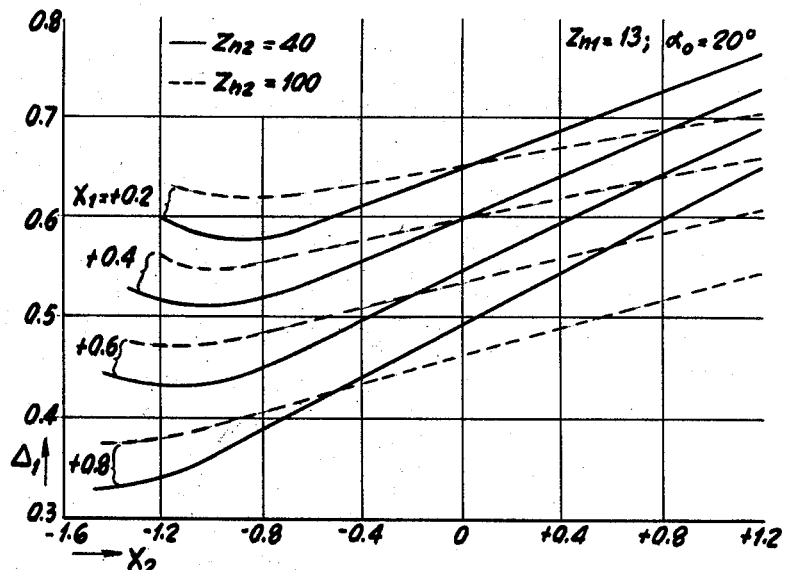

United States Patent Office 3,180,227
Patented Apr. 27, 1965

3,180,227
GEAR TEETH FINISHING
Johann Schlichthörlein, Sandtnerstrasse 1,
Munich, Germany
Continuation of applications Ser. No. 520,961, July 11, 1955, and Ser. No. 662,548, May 29, 1957. This application June 22, 1962, Ser. No. 204,552
29 Claims. (Cl. 90—1.6)

This invention relates to the fininshing of gears and gear-like elements and, more particularly, to gear finishing which is effected by a novel toothed tool in meshing contact with a gear or gear-like element constituting the workpiece and involving a novel interrelation of the tool and the workpiece. The present application is a continuation of my copending applications Serial No. 520,961, filed July 11, 1955 for Gear Teeth Finishing and Serial No. 662,548, filed May 29, 1957 for Gearings.

The fit between mating gears and the smoothness of operation can be greatly increased, and gear noise can be greatly reduced, by proper finishing of the flanks or sides of the gear teeth. For this reason, it is commercially desirable to finish accurately the sides or flanks of gear teeth, with the finish having a predetermined accurate profile, such as an involute or modified involute.

The tools used in gear finishing include rotating tools, such as gear shavers, gear cutters, lapping wheels, grinding wheels, burnishing wheels, worm-shaped tools, or the like, as well as reciprocating rack-like tools. In using such tools, the tool and the workpiece or gear to be finished are in engagement in rolling contact with each other in a generating motion, and with their teeth in meshing engagement at a substantially fixed distance, except for any feed motion, and without backlash. In such operations, the helix angle of the tool usually differs from the helix angle of the work. However, the two helix angles may be equal to each other, and, for example, may be equal to zero. In most operations, the motions of the tool and the workpiece are characterized in that a drive is imparted to either the tool or the workpiece, but not to the other, and the motion is then transmitted from the driven member to the other member.

It is common practice, in finishing gears by shaving, to use rotating shaving wheels having tooth sides or flanks with surface interruptions in the form of cutting grooves extending either in the diametrical plane, or the normal plane, or in parallel planes. To obtain a substantial improvement in the surface quality of rough machined gears, such as milled or slotted gears, it is of the utmost importance that the profiles generated on the workpiece gear should correspond exactly either to an involute or to a modified involute, such as a crowned configuration in the direction of the involute.

However, in the fininshing of gear teeth having involute surfaces, it has not hitherto been possible to avoid the formation of an undesirable groove in one side or flank of the tooth with a corresponding ridge in the other side of the flank or tooth. These grooves or ridges are known as "camel's backs."

On the basis of the formula:

$$s = m\left(\frac{\pi}{2} + 2 \times t_g \alpha_0\right)$$

s=tooth thickness on the pitch circle
m=module
x=profile displacement factor
$\alpha_0$=normal pressure angle
$t_g$=base pitch if it has been desired, for example, to design a tool for a given workpiece gear, such factors as the number of teeth, the profile displacement, the pitch circle of the gear, and the outer diameter of the tool were selected at random, and it was then left to chance as to whether it would be possible, with the particular tool so designed, to produce a correct involute profile on the gear teeth. Primarily in the case of gears having a small number of teeth or a large module, and especially in the case of straight-toothed spur gears, it has been nearly impossible to obtain, with gear shaving, the elimination of the groove in the side or flank of the tooth.

In effect, the methods used hitherto have amounted to trial and error and have been time consuming as well as costly in labor expense. A further expense was involved in the repeated modification or machining of the tool finally to bring the latter to the correct form for producing the proper profile on the workpiece groove, and the number of refininshing operations on the tool was limited due to the fact that eventually the amount of material remaining was insufficient for proper shaving operations.

While various expedients, based on various assumptions and calculations, have been proposed and tried for finishing gear teeth surfaces by shaving, none of these hitherto has been satisfactory insofar as concerns avoidance of the formation of a groove or ridge in the sides or flanks of the tooth. Furthermore, such known methods often involve undue time and labor due to requiring the steps of first shaving a sample gear, then modifying the shaving tool, then shaving a second sample gear, and then repeating these operations until satisfactory results are obtained.

Accordingly, an object of the present invention is to provide a method of finninshing gears in which a desired profile may be formed on the flanks or sides of gear teeth without the undesirable formation of grooves or ridges in such flanks or sides of the teeth.

A further object of the invention is to provide a novel tool, such as a shaving tool, for effecting this method.

Another object of the invention is to provide such a method of fininshing gears involving a novel interrelation between intermeshing tool and workpiece gear.

Still a further object of the invention is to provide a novel gear having involute teeth which are undercut and in which the radially outer beginning of the undercuts is nearer to the gear axis than is the gear dedendum end of the distance of action.

Various terms are used hereinafter to describe the present invention and it is believed desirable to define these terms. The "addendum circle" is the circle circumscribing the outer ends of the teeth. The "dedendum circle" or "root circle" is the circle subscribing the intertooth spaces. The "addendum" is the radial distance from the pitch circle to the addendum circle. The radial distance from the pitch circle to the dedendum circle is usually equal to the addendum, but this is not always the case. The "dedendum" is the radial distance from the pitch circle to the dedendum circle. The "operating pitch circle" of a gear is a circle that rolls on the corresponding circle of the mating gear without sliding and which generally lies between the dedendum circle and the addendum circle. The "rolling contact point" is the point of tangency between the two corresponding circles. The "distance of action" or "line of action" is the distance, measured along the common tangent to the base circles of two intermeshing gears, between the respective intersections of this tangent with the addendum circles of the two gears.

A study of the diagrammatic representation of the meshing engagement between a rotating tool and a workpiece intermeshing therewith, in the normal plane of the teeth demonstrates that, during the generating motion, the contact points travel along the distance of action in such a manner that, during one tooth engagement, there are either two, three, four, five or six tooth flanks or sides of the tool and the work contacting each other at the same time. Thus, the distance of actions may be subdivided into two, three, four, five or six side-contact sections. The normal plane is a plane which extends perpendicular to the face of a tooth and at an acute angle to the diametric plane of the gear.

An important feature of the present invention resides in the use of intermeshing tools and workpieces having dimensions such that, within the distance of action, only even-numbered sections along the distance of action will succeed each other when the rolling contact point is at the transition between two of these sections of the distance of action, or is at one end of the distance of action, or is outside of the distance of action. Furthermore, in accordance with the invention, even-numbered and odd-numbered distance of action sections will succeed each other within the distance of action when the rolling contact point is within an even-numbered distance of action section and when an odd-numbered section, which has the greatest average tooth load acting thereon, is directly contiguous to that part of an even-numbered section, which has the smallest average tooth load operating thereon, as a result of the relative relation of the operating pitch circle.

In further accordance with the invention, it is particularly convenient to use intermeshing tools and workpieces having dimensions such that an odd-numbered distance of action section is situated at the work dedendum end of the distance of action.

Even when the tool and the workpiece are interrelated as just described, two types of grooves in the tooth sides or flanks may still be produced occasionally. When the involute deviation is plotted with respect to the distance of action, as, for example, in the involute diagram of an involute testing apparatus, the diagrammatic curve of the tooth side, looking in the direction from the work addendum to the work dedendum, will, in one case, rise from a medium value to a maximum, then fall to a minimum value, and then rise again. This will be referred to hereinafter as "side groove with falling addendum." In the other case, the curve of the involute diagram, looking in the direction from the work addendum to the work dedendum, will fall from a maximum value to a minimum value, will rise again to a second maximum value, and will then fall. This case will hereinafter be referred to as "side groove with rising addendum."

In accordance with the invention, it has been found that the formation of a side groove generated with a falling dedendum can be substantially or completely avoided by reducing the length ratio $\Delta_1 = c/e$ wherein $e$ is the distance of action and $c$ is the distance between the work dedendum end of the distance of action and the middle of an even-numbered section of the distance of action. Similarly, it has also been found that a groove in a workpiece flank produced with a rising addendum can be substantially or completely avoided by increasing the length of ratio $\Delta_1$.

A reduction of the length ratio $\Delta_1$ may be obtained, for example, by reducing the tool addendum or increasing the work addendum, reducing the tool profile displacement, increasing the work profile displacement, or changing the number of teeth of the work or the tool.

An increase of the length ratio $\Delta_1$ may be obtained, for example, by increasing the tool addendum or decreasing the work addendum, increasing the tool profile displacement, reducing the work profile displacement, or changing the number of teeth of the work or the tool.

A further object of the invention is to provide a method for producing toothed tools, such as shaving wheels, for precision finishing of gear teeth, by first making a tool having dimensions which correspond with the dimensions of the work to be finished so as to satisfy the condition $$\Delta_1 > 0.5 + \frac{\nu}{2}\Delta_3 (\nu = 0, +1, +2\ldots; \Delta_3 = \frac{1}{\epsilon},$$

$$\epsilon = \frac{e}{t_g} = \text{contact ratio}; t_g = \text{base pitch})$$

and then, after testing the tool, eliminating substantially or entirely any error resulting in the generation of a groove in the work tooth side by slightly modifying the tool dimensions, especially the tool addendum.

This method may be effected by first making the tool with a profile displacement corresponding to the condition $\Delta_1 = 0.5 + \nu/2\Delta_3$ at $e \geqq e'$ (where $e'$ = distance of action between the workpiece and its mating workpiece), and with an addendum which is, by a small amount of the order of up to .50 millimeter greater than that corresponding to the condition $\Delta_1 = 0.5 + \nu/2\Delta_3$, then testing the tool with a workpiece to be machined, and when a groove with a falling work addendum is being produced in the work tooth side, reducing the tool addendum by small amounts of the order of 0.10 to 0.20 millimeter until the generation of the groove in the work tooth side is substantially or entirely eliminated.

In order to avoid extensive calculating and drawing work when determining the dimensions of the workpiece and/or the tool, these dimensions, and especially the profile displacement factors $x_1$, $x_2$, of the work and tool, respectively, which satisfy the condition $\Delta_1 = 0.5 + \nu/2\Delta_3$ for certain addenda such as $h_{k1,2} = m(1+x_{1,2})$ (where $m$ = module), either may be read from a "$\Delta$-table" which may contain the corresponding $\Delta_{1,2,3}$-values for various numbers of teeth and for various profile displacement factors of work and tool $$\Delta_2 = \frac{e_{k1}}{e}$$

$e_{k1}$ is the distance between the work addendum end of the distance of action and the rolling point), or may be taken from a "$\Delta$-diagram" such as a $\Delta_1 - x_2$ diagram, on which curves of constant work profile displacement factor $x_1$ are plotted, preferably for a certain number of work teeth and various numbers of tool teeth.

In determining the tooth height of workpieces for a certain tool, one may proceed by first running a sample workpiece, having various addenda, together with the tool, then checking the involute profile of the individual work tooth sides, and finally measuring the addendum of the tooth having the most favorable involute profile. For this purpose there may be used a sample workpiece having an eccentric addendum circle, the average addendum of which satisfies, together with the dimensions of the tool, the condition $\Delta_1 \approx 0.5 + \nu/2\Delta_3$.

In further accordance with the invention, the addendum of a tool whose tooth sides have been reworked one or more times, and which, prior to reworking, were suitable for a certain workpiece in that it did not produce a groove in the sides of the workpiece teeth, may be reduced to an extent such that the length ratio $\Delta_1$ after reworking is substantially equal to the length ratio $\Delta_1$ prior to reworking.

Figure 3A:
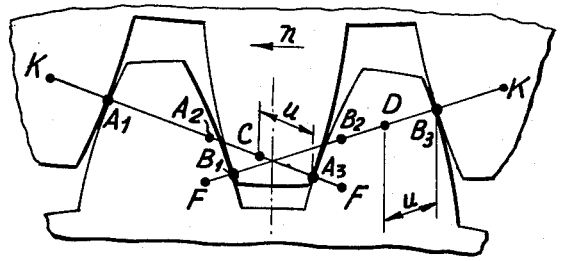
Figure 4A:
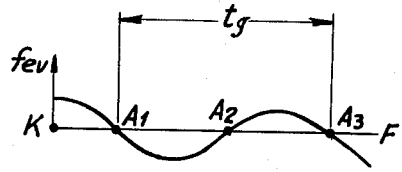
Figure 3B:
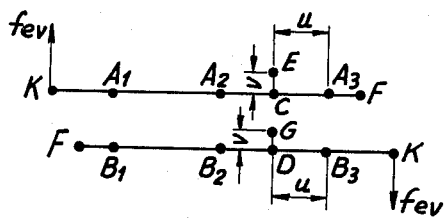
Figure 4B:
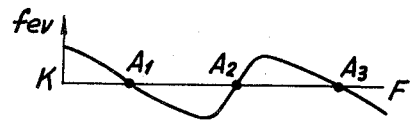
Figure 3C:
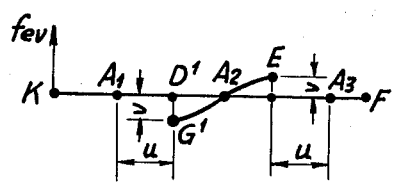
Figure 4C:
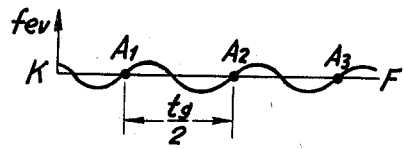
Figure 5A:
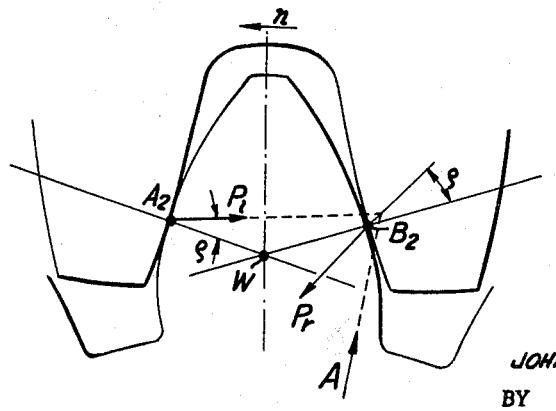
Figure 5B:
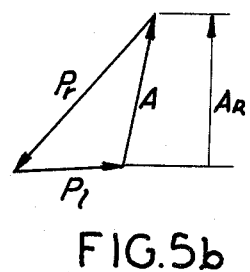
Figure 8:
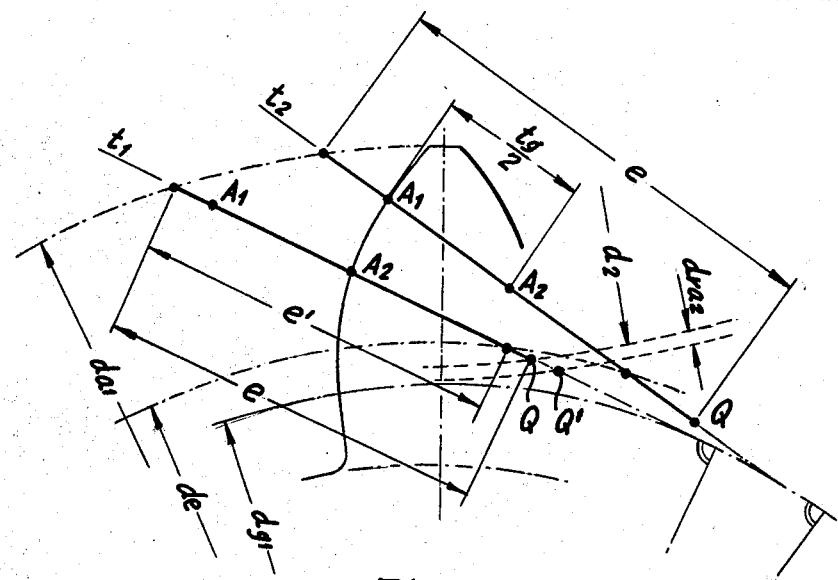
Figure 9:
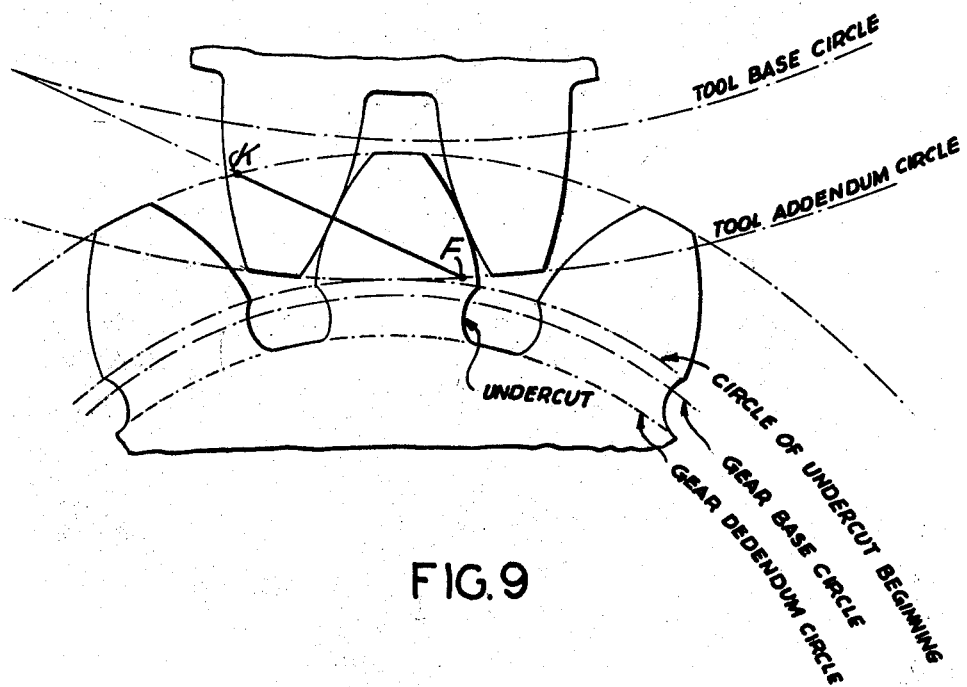
Figure 10:
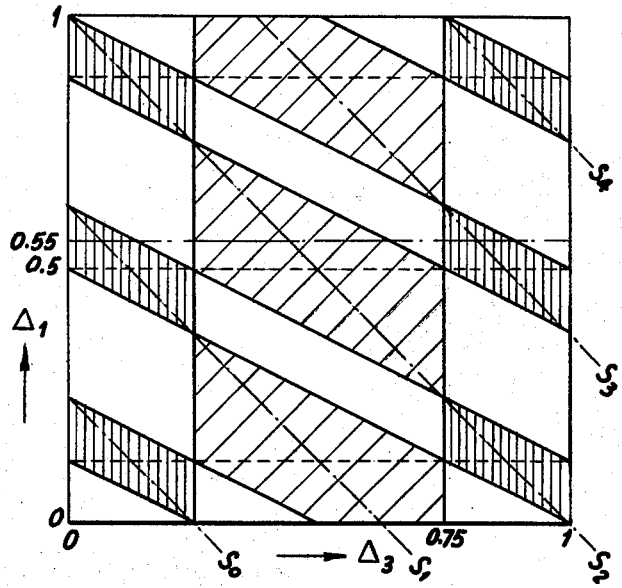
Figure 11:
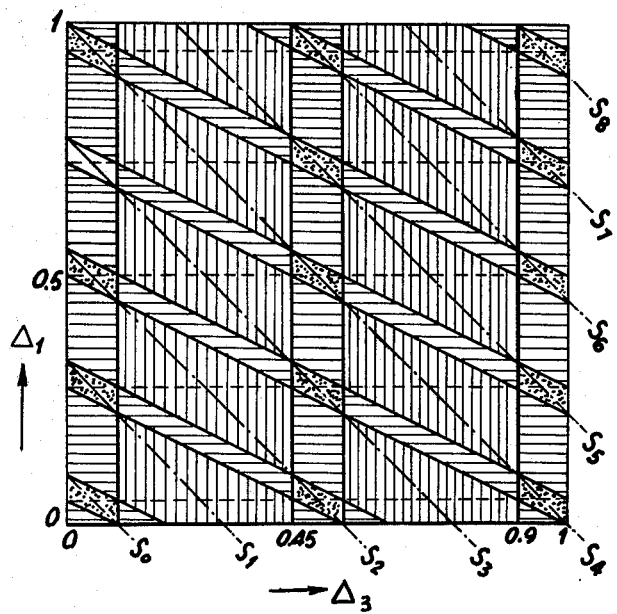
Figure 12:
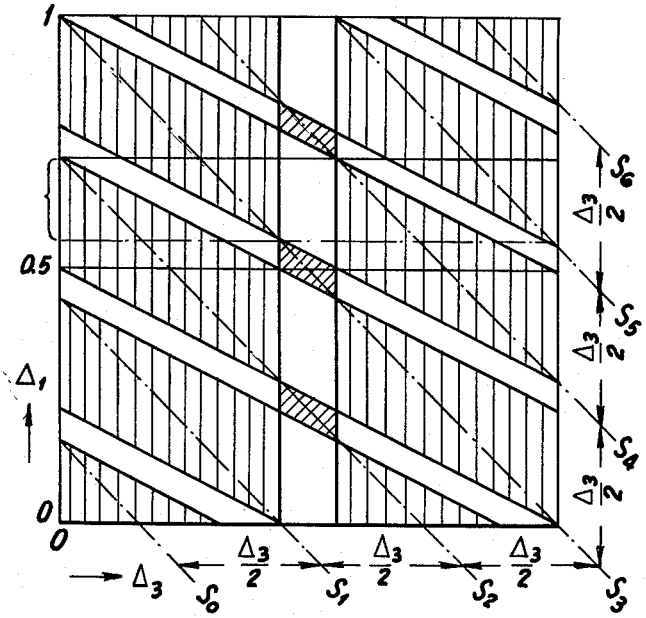
Figure 13:
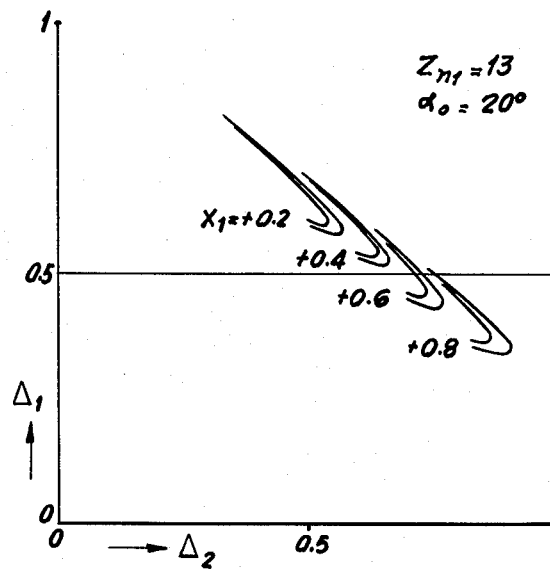

FIGS. 3a, 3b and 3c diagrammatically illustrate the generation of a groove in the side or flank of a workpiece tooth;

FIGS. 4a, 4b and 4c illustrate some types of a workpiece involute diagram;

FIGS. 5a and 5b graphically illustrate the loads on the sides of a workpiece tooth;

FIGS. 6a, 6b, 6c and 6d graphically illustrate respectively, the right and left loads on the sides of a workpiece tooth, the distribution of the load on the sides of a workpiece tooth, an involute diagram and a modified sectioning of the distance of action;

FIGS. 7a, 7b, 7c and 7d are graphic illustrations of the distribution of the loads on a workpiece tooth with different point of rolling contact;

FIG. 8 diagrammatically illustrates a simple method for determining the most favorable tool dimensions for a given workpiece, with respect to the normal plane of the teeth;

FIG. 9 is a diagrammatic representation of the meshing contact between the tool and the work, in the normal plane of the teeth, and illustrating a novel relation of the beginnings of the under-cuts;

FIGS. 10, 11 and 12 are graphic illustrations of possible distance of action sections with relation to the workpiece tooth;

FIG. 13 is a graphical representation of the position of the point of rolling contact on the distance of action as related to the workpiece tooth;

FIG. 14 is a characteristic diagram for the distance of action sections related to the workpiece tooth, and with constant work profile displacement; and FIG. 15 is a table for determining the most favorable dimensions of the tools.

In gear shaving, the center distance between the tool and work during engagement is constant or approximately constant, while a relative tangential movement of the work tooth relative to the tool tooth is possible due to the fact that the axes of the tool and of the work are not coupled. In the following, an exact involute form will be assumed for the tool for the sake of simplicity, even though this condition is unimportant. It will be demonstrated that, in spite of an exact involute profile of the tool, the so-called "camel's back" or side groove may be produced in the side or flank of the work tooth due to the workpiece tooth advancing or lagging behind relative to the tool tooth, the involute diagram curve being normally alike for the right and left-hand sides of the work tooth.

Figure 1:
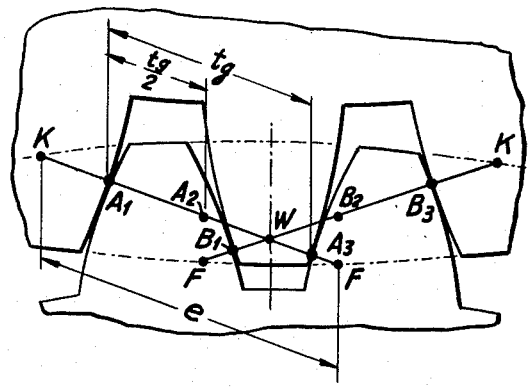
FIG. 1 is a diagrammatic representation of meshing contact between tool and workpiece teeth, in the normal plane of the teeth.
Figure 2:
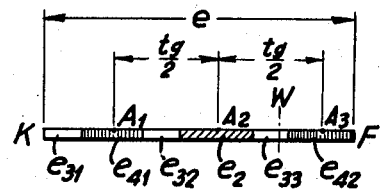
FIGS. 2, 2a and 2b illustrate the distance of action as subdivided into contact sections.
Figure 2B:
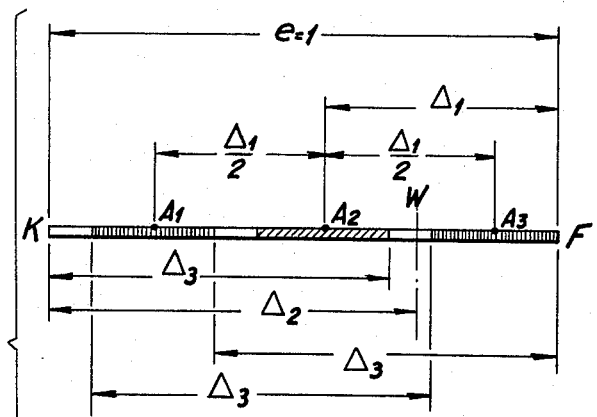
Figure 2A:
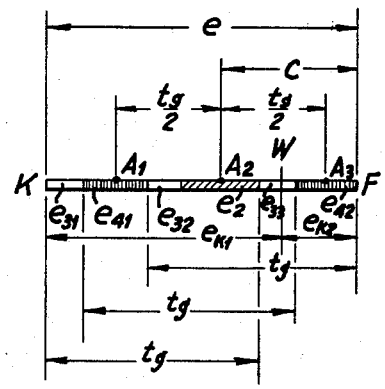

FIG. 1 shows the case in which the tool tooth is disposed symmetrically of the line connecting the two axes. If it is assumed that, during shaving, a groove would be produced in the right-hand side of the work tooth, for example at $B_3$, the left-hand side of the work tooth would have to show a projection at $A_1$. This, however, is contrary to the experience that the left and the right-hand side of the tooth are similar. Thus, there can be produced neither a projection nor a groove at points $B_3$ and $A_1$. The same reasoning applies to points $A_3$ and $B_1$. If the tool is turned through half a pitch in a clockwise direction, the contact point $B_3$ will travel to $B_2$, and the contact point $A_3$ will move to $A_2$. Now the work tooth is disposed symmetrically of the line connecting the two axes. Due to the fact that both work tooth sides are alike, there can be produced neither a projection nor a groove at points $B_2$ and $A_2$. The symmetry points $B_1$, $B_2$, $B_3$, respectively, $A_1$, $A_2$, $A_3$ are spaced from each other on the distance of action $e$ by half a base pitch $t_g/2$ each, and constitute the center points of the two and four-side sections (FIG. 2). The base pitch $t_g$ is the tooth distance measured along the base circle and it is also equal to the tooth distance measured along the lines of action.

As shown in FIG. 1, the four sides of stock and the four sides of the tool touch, with the four points of contact being indicated at $A_1$, $A_3$, $B_1$ and $B_3$. If it is assumed that the wheels shown in FIG. 1 are rotated through a small arc of a turn in one or another direction, it will be found that the four pairs of sides continue to remain in contact with each other during a certain time interval until the tooth sides disengage at F. The corresponding sections, in the case wherein there is a four-side contact, are designated in FIG. 2 by $e_{41}$ and $e_{42}$.

Three pairs of sides are still in contact with each other at the point where the tooth sides disengage at F. The corresponding three-side sections are designated, in FIG. 2, by $e_{31}$, $e_{32}$ and $e_{33}$.

With the position indicated in FIG. 5a, two pairs of sides are in contact at points $A_2$ and $B_2$. There is also two-sided contact when the wheels or gears are rotated out of the position illustrated in FIG. 5a to a slight angular extent in one or the other direction. The section corresponding to the two-sided contact is indicated in FIG. 2, at $e_2$.

While FIG. 2 indicates only one distance of action, in actual fact there are *two* distances of action as action as shown in FIG. 1. Both distances of action KF of FIG. 1 have the same dimensions as the distances of action indicated in FIG. 2.

In FIG. 2, the distance of action $e$ with its addendum end K and its dedendum end F, as related to the work tooth, is subdivided according to FIG. 1 into the two-side-contact section $e_2$, the three-side-contact sections $e_{31}$, $e_{32}$, $e_{33}$, and the four-side-contact sections $e_{41}$, $e_{42}$. The rolling contact point W is situated within the three-side-contact section $e_{33}$. The symmetry points $A_1$, $A_2$, $A_3$ are so situated that if the involute diagram curve of the shaved work tooth side is plotted against the distance of action $e$, this curve must pass through the symmetry points $A_1$, $A_2$, $A_3$.

FIGS. 3a, 3b and 3c relate to the same example as shown in FIGS. 1 and 2. If, in FIG. 3a, the tool is considered to have been rotated in a clockwise direction $n$ so that the contact points $A_3$ and $B_3$ are moved, by a distance $u$ on the distance of action, to the points C and D, with the work tooth rotating negatively relative to the tool tooth by a distance $v$ as measured on the distance of action, the left side of the work tooth will have a projection CE at C and the right side of the work tooth DG at D, both the projection and the groove having a value of $v$, as shown in FIG. 3b. By negative relation motion is meant that when the side of the tool travels along the distance of action from $A_3$ over a distance $u$ toward C, the workpiece shifts laterally from $A_3$ by the distance $u-v$. The distance $v$ represents a small involute error on the sides of the shaved workpiece. In FIGS. 3b and 3c, this error $v$ is plotted over the line of action, and it should be noted that this is the common form of representation of involute errors corresponding to the measured results of the involute testing units. As both sides of the work tooth are alike, each side thereof must have either a projection or a recess at the corresponding points. In FIG. 3c, the recess $v$ which is equal to D'C' at the point D', and which is analogous to $v=DG$ at D on the right side of the tooth, is plotted in correspondence with FIGS. 3a and 3b. As will be noted, the projections and recesses are symmetrical centrally relative to the center $A_2$.

Consequently, the work involute diagram curve is a centrically symmetric curve with the symmetry center $A_2$. A portion $G'A_2E$ is plotted in FIG. 3c, while on the involute diagram it is convenient to plot the involute deviation $f_{ev}$ against the distance of action $e=KF$. A centrically symmetric curve with the zero points or symmetry points $A_1$, $A_2$, $A_3$ is, for example, a sinusoidal curve (FIG. 4a) or a cyclic saw-tooth-shaped curve (FIG. 4b). The cycle of the work involute diagram curve either is equal to the base pitch $t_g$ (FIGS. 4a, 4b), or is equal to an even-numbered part of the base pitch (for example, half a base pitch as in FIG. 4c).

The generation of the undesirable groove in the work tooth side may be avoided in two different ways:

(*Case 1*).—When the medium tooth load $P_m$ plotted against the distance of action $e$, is in mirror symmetry with symmetry lines $S_i$ ($i=0, 1, 2 \ldots$) through the symmetry points $A_i$ ($i=1, 2, 3 \ldots$). $P_m$ is the medium value from the tooth load $P_l$ acting on the left-hand work tooth side and the tooth load $P_r$ acting on the right-hand work tooth side. Tooth loads $P_l$ and $P_r$ are different because of tooth friction and because of the reversal of frictional force on the operating pitch circle. Due to the reversal of the direction of rotation, which occurs from one to several times, the medium tooth load $P_m$ is sufficient for considering the distribution of forces;

(*Case 2*).—When a disturbance of this medium tooth load $P_m$, which is in mirror symmetry with symmetry lines $S_1$ through the symmetry points $A_1$, which would cause the generation of a work tooth side groove, is balanced or made ineffective by a second disturbance which may be controlled as desired. In this case, the second disturbance may even be at a point different from that of the first disturbance, due to the centric symmetry of the work involute diagram.

The value of the medium tooth load $P_m$ in the normal plane of both teeth is composed of a plurality of components. In gear shaving, for example, there are static forces, frictional forces, inertia forces, tooth deflection, cutting force components on the cutting edges, etc. When studying the magnitude of these forces it is found, however, that the inertia forces can amount to only a few kilograms. At first approximation, the tooth deflection is of equal magnitude for each module and may amount to say, a few thousandths of a millimeter, so that it cannot be responsible for the generation of grooves in the tooth sides with a depth in the order of .030 millimeter. For the purpose of these considerations, the cutting force component lying in the normal plane of the teeth may also be neglected due to its small magnitude, so that a limitation to static and frictional forces is possible in first approximation. Thus, it is possible, as shown in FIGS. 5a, to plot, in the normal plane of the teeth on the distance of action $e$, the tooth loads $P_l$ and $P_r$ which act on the work and the lines of action of which are inclined by the angle of friction $\rho$ relative to the distance of action $e$. The radial thrust $A_R$ of the tool (see FIG. 5b) may be used as a measure for this purpose. From the closed polygons of static forces, it is possible to determine, as shown in FIG. 5b, the tooth loads $P_l$ and $P_r$, and from these the medium tooth load $P_m$ may be derived for each point of the work tooth sides in the well-known manner. Thus, for example, in FIGS. 5a and 5b, the tooth load $P_l$ and $P_r$ has been graphically determined for points $A_2$ and $B_2$, respectively, using $A_R$ as a measure with A being the radial thrust acting on the work axis.

Figure 6A:
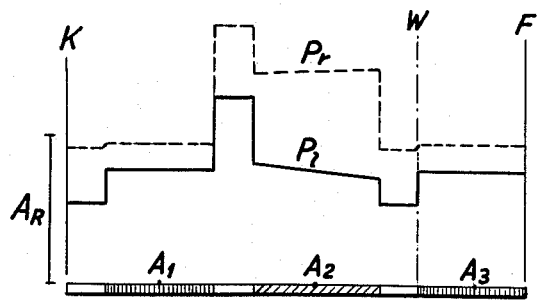
Figure 6B:
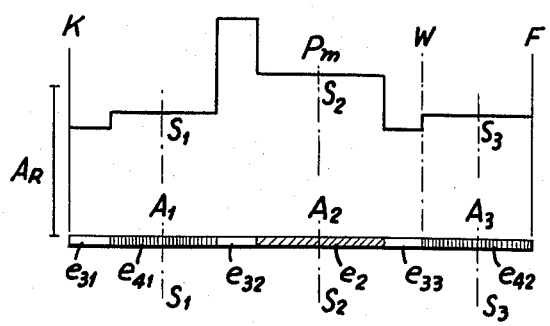
Figure 6C:
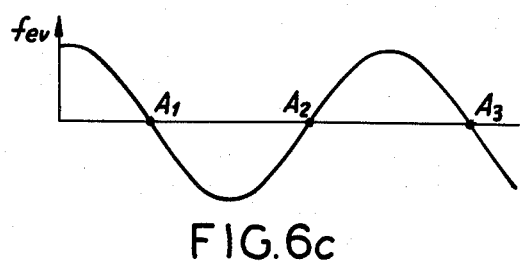

For the example illustrated in FIG. 5a, the tooth loads $P_l$ and $P_r$ are plotted, in FIG. 6a, against the distance of action $e$ with the measure $A_R$. FIG. 6b shows the medium tooth load $P_m$ in a manner similar to FIG. 6a. For this distribution of the medium tooth load $P_m$, FIG. 6c shows the resulting work involute diagram. From this it may be seen that the medium tooth load $P_m$ attains a maximum on the three-side-contact section $e_{32}$, while a minimum of the medium tooth load $P_m$ is situated on each of the two other three-side-contact sections $e_{31}$ and $e_{33}$. The medium tooth load $P_m$, which otherwise acts in mirror symmetry to the symmetry lines $S_1$—$S_1$, $S_2$—$S_2$, and $S_3$—$S_3$, respectively, is disturbed in its symmetry by the presence of the three-side-contact sections $e_{31}$, $e_{32}$, $e_{33}$. This disturbance results in the generation of the tooth side groove at $e_{32}$, as can be seen from FIG. 6c. This is also an example of the generation of a projection on a point of the operating pitch circle W, contrary to the previously mentioned erroneous assumption that only a groove in the tooth side can occur only on the operating pitch circle. The symmetry lines $S_1$—$S_1$, $S_2$—$S_2$, $S_3$—$S_3$ are lines running through the symmetry points $A_1$, $A_2$ and $A_3$.

Figure 6D:
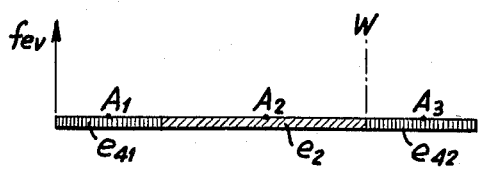

In the example described and illustrated (FIGS. 5a to 6c), the groove in the side of the work tooth could not be generated if the three-side-contact sections $e_{31}$, $e_{32}$, $e_{33}$ were eliminated because, without them, there would exist a symmetrical distribution of the medium tooth load $P_m$ in relation to the symmetry lines $S_1$—$S_1$, $S_2$—$S_2$, $S_3$—$S_3$. This elimination of the three-side-contact sections could be attained, for example, by shortening the distance of action $e$ by the amount of the three-side-contact section $e_{31}$, and thus accordingly by reducing the outside diameter of the work. Thereby the two-side-contact section $e_2$ would increase by the total of the two three-side-contact sections $e_{32}$ and $e_{33}$, as shown in FIG. 6d. The rolling contact point W (FIG. 6d) is situated at the transition between the two-side-contact section $e_2$, and the four-side-contact section $e_{42}$. Consequently, FIGS. 6d shows an example of a distance of action diagram for obtaining an exact work involute, which corresponds to "Case 1" mentioned above. The mirror symmetrical distribution of the medium tooth load would also exist if the rolling point W were situated at the transition between the four-side-contact section $e_{41}$ and the two-side-contact section $e_2$, at the work addendum end K, at the work dedendum end F, or outside of the distance of action $e$, respectively.

"Case 1" can be realized only very seldom. Due to the fact that the profile displacement, which is the tooth thickness on the pitch circle, of a shaving gear and the position of the operating pitch circle are changed by resharpening, this "Case 1" could obtain at the most only once during the life of the shaving gear. If, however, the rolling contact point W is situated within a distance of action section $e_i$ ($i=2, 3 \ldots$), the medium tooth load $P_m$ will suddenly change at this point. FIGS. 7a to 7d show the distribution of the medium tooth load for a few examples.

Figure 7A:
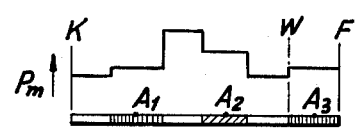
Figure 7B:
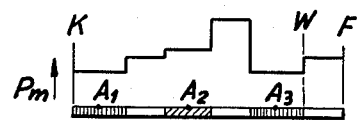
Figure 7C:
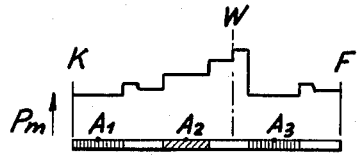
Figure 7D:
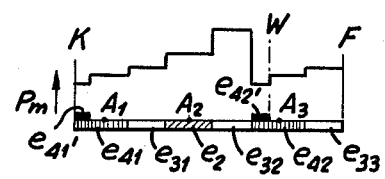

In FIGS. 7a and 7b, the operating pitch circle is situated on the transition between two contact path sections, while in FIGS. 7c and 7d, there is shown a sudden change in the medium tooth load $P_m$, which results from the position of the rolling point W within a contact path section. If the operating pitch circle is situated within a three-side-contact section $e_{32}$ as shown in FIG. 7c (within $e_{31}$ and $e_{33}$ it would be similar), the generation of a groove in the work tooth side may be expected, as results from the distribution of the medium tooth load $P_m$.

In FIGS. 7d, the rolling point W is situated within the four-side-contact section $E_{42}$. The resulting reduction of the medium tooth load on the section $e_{42}'$ to the left of the rolling point W is followed by a considerable increase of the medium tooth load $P_m$ on the three-side-contact section $e_{32}$. While the sudden change of the medium tooth load $P_m$ on the operating pitch circle would cause the generation of a projection on the work tooth side between the symmetry points $A_2$ and $A_3$, the maximum of the medium tooth load $P_m$ (on the three-side-contact section $e_{32}$) would cause the generation of the side groove between the symmetry points $A_2$ and $A_3$. Thus, the operating pitch circle "jumps" in the four-side-contact section $e_{42}$ and in the three-side-contact, as illustrated in FIG. 7d, counteract each other as far as the generation of a groove in the work tooth is concerned. It is therefore only necessary to choose the correct magnitude for these two disturbances ($e_{42}'$ and $e_{31}$, $e_{32}$, $e_{33}$) so that they counterbalance each other in their effects. When the effect of the three-side-contact is predominant, a groove will be produced on the work tooth side between the symmetry points $A_2$ and $A_3$ ("side groove with falling addendum"). In the example referred to, an exact work involute diagram may be obtained by a reduction of the three-side-contact sections, for example, by reducing the external diameter of the tool. However, excessive reduction of the three-side-contact sections, such as would be obtained by further reducing the external diameter of the tool, will allow the effect of the operating pitch circle "jump" to become predominant, which will result in the generation of a side groove between the symmetry points $A_1$ and $A_2$ ("side groove with rising addendum").

The example just described relates to "Case 2.") It is of great practical importance, chiefly in the case of small numbers of work teeth and of low face contact ratios between tool and work.

If a tool is to be made for a number of work pieces which are similar to each other, one may proceed in the following manner: At first, a work tooth disposed symmetrically about a line connecting the two gear centers is laid out (FIG. 8) at an enlarged scale if desired, and conveniently the circle $d_e$, which must be computed, is drawn between the work external diameter $d_{a1}$ and the work base circle $d_{g1}$. The circle $d_e$ denotes the deepest engagement between the work and its mating gear. Next, a few tangents ($t_1, t_2 \ldots$) are laid on the base circle $d_{g1}$, of which, for example, the tangent $t_1$ is selected as the contact path between tool and work, a tangent on which the middle $A_2$ of the distance of action $e$ is situated on the side of the work tooth extending symmetrically to the line connecting the two gear axes, while at the same time the lower end point Q of the distance of action $e$ is situated somewhat inside the circle $d_e$, which means that the distance of action $e$ between the tool and the work is somewhat greater (for instance by 0.25 m.) than the distance of action $e'$ between the work and its mating gear. From the distance of action $e$ thus determined (conveniently in the normal plane of the teeth) and the corresponding operating pressure angle $\alpha_{vn}$ (see FIG. 9), the corresponding tool dimensions, such as the tool profile displacement $x_2m$ and the tool external diameter $d_2$ which passes through Q, may be calculated in the known manner for any selected number of tool teeth $z_2$. The operating pressure angle $\alpha_v n$ is an angle indicating the inclination of the lines of action and can be determined graphically by using a goniometer. The tool may now be made with the calculated profile displacement $x_2m$ and with an external diameter which is greater than the calculated external diameter $d_2$ by a small amount $2dr_{a2}$ (FIG. 8), so that an odd-numbered side contact section QQ' as seen in FIG. 8 (for instance similar to $e_{33}$, FIG. 7d), will be situated on the work dedendum end of the distance of action. Following this, the tool may be tested by running it in mesh with a workpiece to be machined. Due to the fact that the three-side-contact is highly effective, a relatively small external diameter increase $2dr_{a2}$ (for instance .60 to 1.00 millimeter) will suffice to make the effect of the three-side-contact in the work involute diagram apparent by a side groove with falling dedendum. When such a groove is generated in the work tooth side, it is only necessary to reduce the tool external diameter by a small amount in order to obtain a correct work involute profile with the tool. If, as happens occasionally, the tool external diameter is already too small, for instance as a result of excessive grinding, the tool will produce a work tooth side groove with rising addendum. In this case, the generation of the side groove may be avoided by reducing the profile displacement of the tool, as by regrinding the tool tooth sides, without, however, changing the tool external diameter.

However, it is also possible to select distances of action $e$ on other tangents $t_i$ (FIG. 8) which, as will be explained later, will lead to a correct work involute diagram, such as the distance of action on the tangent $t_2$ on which the middle $A_2$ is spaced by half a base pitch $t_g/2$ from the side of the work tooth disposed symmetrically to the line connecting the two axes.

When the rolling point W is situated within a two, four or six-side-contact section ($e_2, e_{4i}$), its influence on the work involute diagram (generation of the side groove) may be counterbalanced by three or five-side-contact sections ($e_{3i}$) in a manner similar to the previously described example, so that a correct work involute diagram is obtained. The five-side-contact with a contact ratio of $\epsilon > 2$ causes an unsymmetric distribution of the medium tooth load $P_m$ (like the three-side contact with $\epsilon < 2$), so that the generation of the side grooves is possible also with $\epsilon > 2$.

All variants of meshing diagrams (including the distance of action sections) may be defined by three length ratios as characteristic values. With the known definitions of FIG. 9 which is a meshing diagram of tool and work in the normal plane of the teeth, there is:

$$\Delta_1 = \frac{c}{e} \qquad \text{(Equation 1a)}$$

$$\Delta_2 = \frac{e_{k1}}{e}; \; \Delta_2' = \frac{e_{k2}}{e} \qquad \text{(Equation 1b)}$$

$$\Delta_3 = \frac{1}{\epsilon} \qquad \text{(Equation 1c)}$$

wherein
$\Delta_1$ designates the position of a symmetry point A,
$\Delta_2$ gives the position of the rolling point W, and
$\Delta_3$ is the reciprocal of the contact ratio $\epsilon$.

The $\Delta$-characteristics may be computed easily from the gearing data in accordance with the known rules of involute trigonometry. Since these characteristic values are independent of the module $m$, it is convenient to enter in the calculations $m=1$.

As shown in FIG. 9, symmetry point A is the intersection of the distance of action $e$ with the workpiece tooth side of that workpiece lodges symmetrically with respect to the line joining the center points of the two wheels. The distance separating the symmetry point A from the work dedendum end of the distance of action is designated in FIG. 9 by $c$. Thus, the position of symmetry point A on the distance of action is determined by the dimensional relation of $\Delta_1 = c/e$. The position of point A is not governed by $\Delta_2$ and $\Delta_3$.

The interrelation between the usual gearing data and the $\Delta$-values is given, for example, by the following relations:

$$\operatorname{tg} \alpha_{S1,2} = \frac{\operatorname{tg} \alpha_0}{\cos \beta_{0\,1,2}}; \; Z_{n1,2} = Z_{1,2} \cdot \frac{\operatorname{inv} \alpha_{S1,2}}{\operatorname{inv} \alpha_0}$$

$(\operatorname{inv} \alpha = \operatorname{tg} \alpha - \operatorname{arc} \alpha)$ $$\operatorname{inv} \alpha_{vn} = \operatorname{inv} \alpha_0 + 2 \operatorname{tg} \alpha_0 \cdot \frac{x_1 + x_2}{z_{n1} + z_{n2}}$$

$$a_n = \frac{z_{n1} + z_{n2}}{2}; \; a_{nv} = a_n \cdot \frac{\cos \alpha_0}{\cos \alpha_{vn}}$$

$$r_{gn1,2} = \frac{z_{n1,2}}{2} \cdot \cos \alpha_0; \; r_{an1,2} = \frac{z_{n1,2}}{2} + \frac{h_{k1,2}}{m}$$

$$s_1 = \frac{\pi}{2} + 2x_1 \operatorname{tg} \alpha_0$$

$$\frac{s_{gn1}}{2} = \frac{s_1}{2} \cdot \cos \alpha_0 + r_{gn1} \cdot \operatorname{inv} \alpha_0$$

$$q = r_{gn1} \cdot \operatorname{arc} \alpha_{vn} + \frac{s_{gn1}}{2}; \; f = r_{gn1} \cdot \operatorname{tg} \alpha_{vn}$$

$$\cos \alpha_{a1,2} = \frac{r_{gn1,2}}{r_{an1,2}}; \; e_{k1} = r_{gn1} \cdot \operatorname{tg} \alpha_{a1} - f$$

$$e_{k2} = r_{gn2} \cdot [\operatorname{tg} \alpha_{a2} - \operatorname{tg} \alpha_{vn}]$$

$$e = e_{k1} + e_{k2}; \; \epsilon = \frac{e}{\pi \cos \alpha_0}$$

$$c = e_{k2} + q - f$$

$$\Delta_1 = \frac{c}{e}; \; \Delta_2 = \frac{e_{k1}}{e}; \; \Delta_2' = \frac{e_{k2}}{e}; \; \Delta_3 = \frac{1}{\epsilon}$$

In the relations:

$m$ = the module, $$\left(\text{module} = \frac{25.4}{\text{pitch}}\right)$$

where the module is in centimeters and the pitch is in inches;
$\alpha_0$ = the nominal pressure angle on the pitch circle;
$a$ = the center distance;
$z$ = the number of teeth;

$\beta_0$ = the helix angle on the pitch circle;
$h_k$ = the addendum height;
$x$ = the profile displacement factor;
$r$ = the radius;
$s$ = the tooth thickness;
$e$ = the distance of action;
Index $s$ = in the diametral plane of the teeth;
Index $n$ = in the normal plane of the teeth;
Index $g$ = on the base circle;
Index $a$ = on the addendum circle;
Index 1 = on the work;
Index 2 = on the tool;
Index $k$ = on the addendum;
Index $o$ = on the pitch circle;
$\epsilon$ = the contact ratio;
Index $v$ = taking into account the profile displacement.

The length ratios $\Delta_1$ and $\Delta_3$ determine which distance of action sections $e_i$ succeed each other in the distance of action $e$ between tool and work. In the $\Delta_{1,3}$ diagram (FIGS. 10 to 12), each horizontal represents a possible distance of action $e$, $e$ being assumed equal to 1. On the left side is the work tooth addendum K and on the right is the work tooth dedendum F. The obliquely hatched areas (FIGS. 10 and 12) represent two-side contact, the vertically hatched areas four-side contact and the light areas three-side contact. For example, with $\Delta_3 = .75$ (FIG. 10), four, three, two, three, four and three-side-contact sections succeed each other in a distance of action $e$ with $\Delta_1 = .55$ (seen in the direction from the work tooth addendum to the work tooth dedendum).

In FIG. 11 the horizontally hatched areas designate five-side contact, while the dotted areas designated six-side contact. The symmetry point A (FIG. 9) is situated on a line $S_i$ (FIGS. 10 to 12), where $i = 1, 2, 3. \ldots$ The other symmetry points are each spaced by a distance of half a base pitch or a multiple thereof, i.e., by $\nu/2\Delta_3(\nu=1, 2 \ldots)$ in the $\Delta_{1,3}$ diagram (FIGS. 10 to 12) it may be seen that the contact paths with $$\Delta_1 = 0.5 + \frac{\nu}{2}\Delta_3 (\nu = 0, \pm 1, \pm 2 \ldots)$$

(Equation 2)

comprise only even-numbered (two, four, six) side-contact sections. With all other $\Delta_1$ values, even and odd-numbered side-connect sections alternately succeed each other in the distance of action. If $\Delta_1$ is greater by a small amount than $.5 + \nu/2\Delta_3$, an odd-numbered side contact section is situated on the work dedendum end of the distances of action.

With $1 < \epsilon < 1.5$ (FIG. 10), there are two or three symmetry points on one distance of action. With $1.5 < \epsilon < 2$ (FIG. 12), three or four symmetry points are possible. In FIG. 12, a band with four symmetry points is designated by a bracket. With $\epsilon > 2$ (FIG. 11) there are four or five symmetry points.

When the rolling point W is situated within the distance of action paths $e$, a symmetric distribution of the medium tooth load $P_m$ exists when, in addition to Equation 2, the condition that both $$\Delta_2 \text{ and } \Delta_2' = \nu\Delta_3(\nu=0, 1, 2) \quad \text{(Equation 3)}$$

is also satisfied (in accordance with "Case 1").

FIG. 13 shows a $\Delta_{1,2}$-diagram for a number of work teeth $z_{n1} = 13$ ($z_n$ is the calculatory number of teeth in the normal plane of the teeth) with a nominal pressure angle $\alpha_0 = 20°$, and an addendum height $$h_{k1,2} = m(1 + x_{1,2})$$

(The index 1 relates to the work, the index 2 to the tool.) Every horizontal in the $\Delta_{1,2}$-diagram represents, as in FIGS. 10 to 12, a distance of action between tool and work. In FIG. 13, rolling point curves at constant work profile displacement factor $x_1$ are plotted in pairs, each of the right-hand curves corresponding to the smallest number of tool teeth, and each of the left hand curves corresponding to the greatest number of tool teeth, depending on the module. The upper end point of each curve represents the rolling point at the greatest possible positive tool profile displacement, while the lower end point represents the rolling point at the greatest possible negative tool profile displacement. The tool profile displacement decreases continuously from the upper towards the lower end of each curve. It can be seen in which manner the position of the rolling point W is changed by repeated sharpening of the tool, if by this resharpening the tool addedum $h_{k2}$ would be reduced each time by the same amount as the tool profile displacement $x_2 m$. With decreasing tool profile displacement factor $x_2$ and constant $x_1$, $\Delta_1$ will also decrease to a minimum, after which it increases again slightly. When the profile displacement factor $x_2$ of the tool is so chosen that the rolling point W is situated close to the minimum of a rolling point curve, $x_1$ = constant, then $\Delta_1$ will remain almost unchanged, and $\Delta_2$ will be changed by only a slight amount upon resharpening of the tool.

With great magnification, lines of constant $x_2$ and $\Delta_3$, etc. could be entered in FIG. 13. It is also convenient to make use of a "$\Delta$-Table" (FIG. 15) which, in addition to the $\Delta$-characteristic values, also contains the corresponding gearing data of tool and work. It is sufficient to relate all data to normal addendum heights $h_{k1,2} = 1 + x_{1,2}$ at $m = 1$. Intermediate values may be readily determined by interpolation.

FIG. 14 shows a $\Delta_1$-$x_2$-diagram with lines of constant $x_1$ (for the same example as FIG. 13). From this diagram may be read the profile displacement factors $x_{1,2}$ of work and tool, which correspond to Equation 2.

When making or using tools for or with given workpieces, it is in most cases sufficient to consider only the length ratio $\Delta_1$. Thereby, the profile displacement of the tool may correspond to Equation 2. It is convenient, however, first to use a tool addendum which is greater than the addendum corresponding to Equation 2 by a slight amount, for instance by .30 to .50 millimeter. If now the influence of the odd-numbered side-contact sections is predominant, a work side groove with falling dedendum will be produced when the tool is tested. It is then necessary to reduce the length ratio $\Delta_1$ by a small amount, especially by shortening the tool addendum.

It is also possible to reduce the length ratio $\Delta_1$ by increasing the work addendum $h_{k1}$, by reducing the tool profile displacement $x_2 m$ (see FIG. 14), by increasing the work profile displacement $x_1 m$, by changing the number of teeth of the work $z_{n1}$ or of the tool $z_{n2}$ (seen in the normal plane of the teeth), etc.

If, however, a work tooth side groove with rising addendum is produced during testing of the tool, the length ratio $\Delta_1$ must be increased, especially by reducing the tool profile displacement (regrinding of the tool tooth sides) while leaving the original tool addendum unchanged (the tool external diameter must not be ground).

The length ratio $\Delta_1$ may also be increased by increasing the tool addendum $h_{k2}$, by reducing the work addendum $h_{k1}$, by icreasing the tool profile displacement $x_1 m$ (see FIG. 14), by changing the number of work teeth $z_{n1}$ or the number of tool teeth $z_{n2}$, etc.

The length ratio $\Delta_1$ may also be changed by tip chamfering of the roughed work teeth or by undercutting the roughed work teeth on their dedendum, when the roughing tools are given the corresponding shape. Undercutting of the roughed work teeth on their dedendum for shortening the contact paths (reduction of $\Delta_1$, for instance in order to obtain $\Delta_1$ = approximately .50) is not suitable when this greatly reduces the contact ratio or when the distances of action extend very close to the work base circle. Even small variations in the dimensions of the roughed work teeth within the specified tolerances will then produce very unstable conditions, which are brought about by the pronounced influence which the beginning of the undercut has on $A_1$. Moreover, when the roughed work teeth are undercut on their dedenda, it is no longer possible to correct a poor shaving result by changing the tool external diameter if the tool addendum edge no longer exerts a cutting action, but engages into the undercut in the work dedendum.

Using a few correct shaving results as a basis, it is possible to determine empirically the required magnitude of the odd-numbered side-contact sections (deviation from Equation 2), depending on the influence of the rolling circle (deviation from Equation 3), and also for various operating pressure angles $\alpha_{vn}$ (in the normal plane of the teeth).

Nevertheless, it is convenient to test the tool before putting it into use, since during this test minor faults may be recognized and eliminated in accordance with the invention. The invention provides for obtaining the best result in each case, even without these exact values.

Referring back to FIG. 9, it will be noted that, contrary to the prior art, the radially outer ends of the undercuts in the sides of the gear teeth are nearer the gear axis than is the gear dedendum end F of the distance of action $e$.

It will be understood that the invention is not limited to the machining methods mentioned in the foregoing description. Due to the fact that in machines in which the tool axis and the work axis are coupled there is often the possibility of the work tooth advancing or lagging behind relative to the tool tooth in spite of the coupling (as a result of the machine clearances or of elasticity), the invention may also be successfully applied to such machining operations.

While specific embodiments of the invention have been shown and described in detail to illustrate the application of the principles of the invention, it will be understood that the invention may be embodied otherwise without departing from such principles.

What is claimed is:

1. A method of finishing a gear by employing a finishing tool, comprising removing the metal from the gear by running the gear in mesh without backlash with a gear-like or rack-like or worm-shaped finishing tool with accurate or modified involute teeth having dimensions such that, within the distances of action, substantially only even-numbered contact path sections succeed each other when the rolling point is adjacent the point of transition between two of said contact path sections, also when said rolling point is adjacent one end of said distances of action, and when said rolling point is outside of said distances of action, while alternately even-numbered and odd-numbered contact path sections succeed each other within said distances of action when said rolling point is situated within an even-numbered contact path section and, at the same time, an odd-numbered contact path section, on which acts the greatest average tooth load, is directly contiguous to that part of an even-numbered contact path section on which acts the smallest average tooth load, as a result of the location of said rolling point.

2. The method of finishing the tooth sides of a gear by means of a toothed tool; comprising the steps of finishing said gear by removing metal therefrom by maintaining said toothed tool in rolling contact with said gear in such a manner that within the distances of action alternatively even-numbered and odd-numbered contact path sections succeed each other, the rolling point is situated within even-numbered contact path sections, and odd-numbered contact path sections are situated at the gear dedendum ends of said distances of action.

3. The method of finishing the tooth sides of a gear by means of a toothed tool; comprising the steps of finishing said gear by removing metal therefrom by maintaining said toothed tool in rolling contact with said gear in such a manner that within the distances of action, alternatively even-numbered and odd-numbered contact path sections succeed each other and the rolling point is situated within even-numbered contact path sections, and odd-numbered contact path sections are situated at the gear dedendum ends of said distances of action; and then reducing the length ratio $A_1=c/e$ by a small amount of the order of 0.02, by reducing the tool addendum height by grinding, when gear tooth side grooves with falling addendum are produced on the gear teeth, where $c$ is the distance between the middle of an even-numbered contact path section and the gear dedendum end of a distance of action, and $e$ is the distance of action.

4. The method of finishing the tooth sides of a gear by means of a toothed tool; comprising the steps of finishing said gear by removing metal therefrom by maintaining said tool and said gear in rolling contact with each other without backlash in a generating motion so that, within the distances of action, alternatively even-numbered and odd-numbered contact path sections succeed each other and the rolling point is situated within even-numbered contact path sections, and odd-numbered contact path sections are situated at the gear dedendum ends of said distances of action; reducing the length ratio $A_1$ by changing the addendum height of the gear by a small amount of the order of 0.10 millimeter when gear tooth side grooves with falling addendum are produced on the gear teeth.

5. The method of finishing the tooth sides of a gear by means of a toothed tool; comprising the steps of finishing said gear by removing metal therefrom by maintaining said tool and said gear in rolling contact with each other without backlash in a generating motion so that, within the distances of action, alternatively even-numbered and odd-numbered contact path sections succeed each other and the rolling point is situated within even-numbered contact path sections and odd-numbered contact path sections are situated at the gear dedendum ends of said distances of action; increasing the length ratio $A_1$ by reducing the addendum height of the gear by a small amount of the order of 0.10 millimeter, when tooth side grooves with rising addendum are produced on the gear teeth.

6. The method of finishing the tooth sides of a gear by means of a toothed tool; comprising the steps of finishing said gear by removing metal therefrom by maintaining said tool and said gear in rolling contact with each other without backlash in a generating motion so that, within the distances of action, alternatively even-numbered and odd-numbered contact path sections succeed each other and the rolling contact point is situated within even-numbered contact path sections, and odd-numbered contact path sections are situated at the gear dedendum ends of said distances of action; increasing the length ratio $A_1$ by reducing the profile displacement of the tool by a small amount of the order of 0.10 millimeter, by grinding the tooth sides of the tool without changing the tool addendum height, when tooth side grooves with rising addendum are produced on the gear teeth.

7. The method of finishing the tooth sides of a gear by means of a toothed tool; comprising the steps of finishing said gear by removing metal therefrom by means of said tool with said gear and said tool in rolling contact with each other without backlash in a generating motion, said tool having such dimensions that, with the gear dimensions, the length ratio $A_1'=c/e$ is by a small amount, between 0 and .10, greater than $0.5+\nu/2\Delta_3$, where $c$ is the distance between the middle of an even-numbered contact path section and the gear dedenum end of the distance of action, $e$ is the distance of action, $\nu=0, \pm1, \pm2\ldots$, and $\Delta_3$ is the reciprocal of the contact ratio; and then successively reducing the tool addendum height by grinding away small amounts of the order of 0.10 millimeter, until said tool produces correct gear tooth sides without side grooves.

8. The method of finishing the tooth sides of a gear by means of a toothed tool; comprising the step of machining with said tool a sample gear having an eccentric addendum circle in order to provide various involute forms of individual gear tooth sides to permit selection, by mensuration of the addendum height of the gear tooth having the most suitable involute form, the medium addendum height of said sample gear corresponding approximately, together with the dimensions of the tool, to the condition $\Delta_1$ is approximately $0.5+\nu/2\Delta_3$, where $\Delta_1=c/e$, $c$ is the distance between the middle of an even-numbered contact path section and the gear dedendum end of the distance of action, $e$ is the distance of action, $\nu=0, \pm1, \pm2 \ldots$, and $\Delta_3$ is the reciprocal of the contact ratio.

9. The method of producing a tooth profile of a gear constituting a workpiece, by machining with a toothed finishing tool, so that the tooth profile of the gear is exactly conjugate to the toothed profile of the tool; comprising the steps of initially forming the toothed tool to a predetermined shape and dimensions so that the same comply with the following relation: $\Delta_1=c/e$ is by a small amount of the order of between 0 and 0.10 greater than $$0.5+\nu/2\Delta_3$$

wherein $e$ designates the distance of action between said tool and said workpiece, $c$ is the distance between the middle of an even-numbered contact section and the workpiece dedendum end of said distance of action $e$, $\nu$ is equal to $0, \pm1, \pm2 \ldots$, and $\Delta_3$ is the reciprocal of the contact ratio; applying said tool to said workpiece with relative rotary generating motion to machine a finished gear from said workpiece; subjecting said tool and the finished gear to test for accuracy of the respective dimensions thereof; and correcting to a minor degree, by machining a dimension of said tool determined in accordance with the result of said test, thereby to eliminate substantially any residual error in said determined dimension.

10. The method according to claim 9, wherein the corrected dimension is a dimension of the tool addendum.

11. The method as specified in claim 10, wherein the dimension of the tool addendum is subjected to change by grinding, whereby said residual error in said addendum is substantially eliminated.

12. The method of finishing a preshaped toothed gear comprising forming a toothed finishing tool dimensioned so that the following relation is established: $\Delta_1=c/e$ is approximately $0.5+\nu/2\Delta_3$, wherein $e$ designates the distance of action between said tool and workpiece, $c$ is the distance between the middle of an even-numbered contact path section of said distance of action and the workpiece dedendum end of said distance of action $$\nu=0, \pm1, \pm2 \ldots$$

and $\Delta_3$ is the reciprocal of the contact ratio; whereby said tool has an addendum height intermediate the addendum height corresponding to the relation $\Delta_1=0.5+\nu/2\Delta_3$ and the last-mentioned addendum height plus 0.5 millimeter; and maneuvering said tool to machine the tooth sides of the toothed gear into accurate or modified involutes conjugate to those of the tooth sides of said tool.

13. The method of forming a preshaped toothed gear comprising employing a toothed tool dimensioned so that the following relation is established: $\Delta_1=c/e$ is approximately $0.5+\nu/2\Delta_3$, wherein $e$ designates the distance of action between said tool and workpiece, $c$ is the distance between the middle of an even-numbered contact path section of said distance of action and the workpiece dedendum end of said distance of action, $\nu=0, \pm1, \pm2 \ldots$, and $\Delta_3$ is the reciprocal of the contact ratio; whereby said tool has an addendum height intermediate the addendum height corresponding to the relation $\Delta_1=0.5+\nu/2\Delta_3$ and the last-mentioned addendum height plus 0.5 millimeter; said tool being maneuvered to shape the tooth sides of the toothed gear into accurate or modified involutes according to those of the tooth sides of said tool; wherein the aforesaid distance of action of said tool and the ultimately formed gear is greater than the distance of action of said ultimately formed gear and a gear mating therewith by an amount of the order of $0.25 \, m$ where $m$ is the gear module.

14. The method of finishing the tooth sides of a toothed body by machining by a toothed tool wherein the said body and tool engage each other without backlash in a generating motion for the purpose machining of the tooth sides of said body, which comprises the steps of machining said body with said tool in rolling contact with said body and disposing said tool in relation to said body to effect even-numbered distance of action sections in succession when the point of rolling contact is at the point of transition between two of said distance of action sections, and also when the point of rolling contact is at one end of said distances of action and disposing said tool to effect even-numbered and odd-numbered distance of action sections in succession within said distances of action when said point of rolling contact is situated within an even-numbered section.

15. The method of finishing the tooth sides of a gear by means of a toothed tool; comprising the steps of finishing said gear by machining it by said tool with said gear and said toothed tool in rolling contact with said gear so that within the distance of action alternatively even-numbered and odd-numbered distance of action sections succeed each other and the rolling point is situated at the gear dedendum end of said distance of action; and then reducing the length ratio $\Delta_1=c/e$ by a small amount of the order of 0.02 by grinding in the case of tooth side grooves with falling addendum being produced on the gear teeth, where $c$ is the distance between the middle of an even-numbered section and the gear dedendum end of the distance of action and $e$ is the length of the distance of action.

16. The method of finishing the tooth sides of a gear by means of a toothed tool; comprising the steps of finishing said gear by machining by said tool with said tool and said gear in rolling contact with each other without backlash in a generating motion so that within the distance of action alternatively even-numbered and odd-numbered distance of action sections succeed each other and the rolling point is situated within an even-numbered section and an odd-numbered section is situated at the gear dedendum end of said distance of action; reducing the length ratio $\Delta_1$ by reducing the addendum height of the tool by a small amount of the order of 0.10 millimeter, in the case of tooth side grooves with falling addendum being produced on the gear teeth.

17. The method of finishing the tooth sides of a gear by means of a toothed tool; comprising the steps of finishing said gear by machining by said tool with said gear and said tool in rolling contact with each other without backlash in a generating motion, said tool having such dimensions that, with the gear dimensions, the length ratio $\Delta_1=c/e$ is by a small amount between 0 and 0.10 greater than $0.5+\nu/2\Delta_3$, where $c$ is the distance between the middle of an even-numbered distance of action section and the gear dedendum end of the distance of action and $e$ is the length of the distance of action, $\nu=0, \pm1, \pm2 \ldots$, $\Delta_3$ is the reciprocal of the contact ratio; and then successively reducing the tool addendum height by machining away small amounts until said tool produces correct gear tooth sides in said gear without side grooves.

18. The method of finishing the tooth sides of a gear by means of a toothed tool; comprising the step of machining with said tool a sample gear having an eccentric addendum circle in order to provide various involute forms of individual gear teeth sides to permit selection by mensuration of the addendum height of the gear tooth having the most suitable involute form, said machining being done to effect a medium addendum height of said sample gear approximately corresponding, together with the dimensions of the tool, to the condition $$\Delta_1=0.5+\nu/2\Delta_3$$

where $\Delta_1=c/e$, $c$ is the distance between the middle of an even-numbered distance of action section and the gear dedendum end of the distance of action and $e$ is the length of the distance of action, $\nu=0, \pm1, \pm2 \ldots, \Delta_3$ is the reciprocal of the contact ratio.

19. The method of producing a tooth profile of a gear constituting a workpiece, by machining with a toothed finishing tool, so that the profile is an accurate involute of the toothed profile of the tool; comprising the steps of initially forming to the toothed tool with predetermined shape and dimensions so that same comply with the following relation: $\Delta_1=c/e$ is approximately $0.5+\nu/2\Delta_3$, wherein $e$ designates the length of action line between said tool and said workpiece, $c$ is the distance between an even-numbered action line section and the workpiece dedendum end of said action line $e$, $\nu$ is equal to $0, \pm1, \pm2 \ldots$, and $\Delta_3$ is the reciprocal of the contact ratio of said action line length $e$ and the base pitch of the gear when ultimately finished from said workpiece by means of said tool; applying said tool to said workpiece with relative rotary generating motion to form from said workpiece said finished gear; subjecting said tool and the finished gear to test for accuracy of the respective dimensions thereof; and correcting to a minor degree, by machining, a dimension of said tool determined in accordance with the result of said test, thereby to eliminate substantially any residual error in said determined dimension.

20. The method according to claim 19, wherein the corrected dimenison is a dimension of the tool addendum.

21. The method as specified in claim 20, wherein the dimension of the tool addendum is subjected to change by grinding, whereby said residual error in said addendum is substantially eliminated.

22. A gear finishing tool with accurate or modified involute teeth for finishing the teeth of a specified involute gear by running the tool in mesh with said gear, said tool having the form of a gear or a rack or a worm conjugate to the gear to be finished and adapted to mesh therewith, the tool dimensions being such that, within the distances of action, substantially only even-numbered contact path sections succeed each other when the rolling point is adjacent the point of transition between two of said contact path sections, also when said rolling point is adjacent one end of the distances of action, and when said rolling point is outside of said distances of action, while alternatively even-numbered and odd-numbered contact path sections succeed each other within said distances of action when said rolling point is situated within an even-numbered contact path section, on which acts the greatest average tooth load, is directly contiguous to that part of an even-numbered contact path section on which acts the smallest average tooth load, as a result of the location of said rolling point.

23. A gear finishing tool with accurate or modified involute teeth for finishing the teeth of a specified involute gear by running the tool in mesh with said gear, said tool having the form of a gear or a rack or a worm conjugate to the gear to be finished and adapted to mesh therewith, the tool dimensions satisfying the following relation: $\Delta_1=c/e$ is approximately $0.5+\nu/2\Delta_3$, wherein $e$ designates the distance of action between said tool and workpiece, $c$ is the distance between the middle of an even-numbered contact path section of said distance of action and the workpiece dedenum end of the distance of action $e$, $\nu=0, \pm1, \pm2 \ldots$, and $\Delta_3$ is the reciprocal of the contact ratio of said distance of action $e$ and the base pitch.

24. A gear finishing tool with accurate or modified involute teeth for finishing the teeth of a specified involute gear by running the tool in mesh with said gear, said tool having the form of a gear or a rack or a worm conjugate to the gear to be finished and adapted to mesh therewith, the tool dimensions satisfying the following relation: $\Delta_1=c/e$ is approximately $0.5+\nu/2\Delta_3$, wherein $e$ designates the distance of action between said tool and workpiece, $c$ is the distance between the middle of an even-numbered contact path section of said distance of action and the workpiece dedendum end of the distance of action $e$, $\nu=0, \pm1, \pm2 \ldots$, and $\Delta_3$ is the reciprocal of the contact ratio, whereby said tool has an addendum height intermediate the addendum height corresponding to the relation $\Delta_1=c/e=0.5+\nu/2\Delta_3$ and the last-mentioned addendum height plus 0.5 millimeter.

25. A gear finishing tool with accurate or modified involute teeth for finishing the teeth of a specified involute gear by running the tool in mesh with said gear, said tool having the form of a gear or a rack or a worm conjugate to the gear to be finished and adapted to mesh therewith, the tool dimensions satisfying the following relation: $\Delta_1=c/e$ is approximately $0.5+\nu/2\Delta_3$, wherein $e$ designates the distance of action between said tool and workpiece, $c$ is the distance between the middle of an even-numbered contact path section of said distance of action and the workpiece dedendum end of the distance of action $e$, $\nu=0, \pm1, \pm2 \ldots$, and $\Delta_3$ is the reciprocal of the contact ratio, whereby said tool has an addendum height intermediate the addendum height corresponding to the relation $\Delta_1=c/e=0.5+\nu/2\Delta_3$ and the last-mentioned addendum height plus 0.5 millimeter, and whereby the distance of action between tool and workpiece is slightly greater than the distance of action between the workpiece and a gear mating therewith.

26. A gear finishing tool as specified in claim 25, wherein the distance of action of tool and workpiece is greater than the distance of action of said workpiece and a gear mating therewith by approximately $0.25\ m$, $m$ being the module.

27. The method of making a gear finishing tool for finishing gears similar to each other, comprising the steps: first making a tool having such dimensions that, with the gear dimensions, the length ratio $\Delta_1=c/e$ is by a small amount greater than $0.5+\nu/2\Delta_3$, where $c$ is the distance between the middle of an even-numbered contact path section of the distance of action $e$ and the gear dedendum end of the distance of action $e$, and $\nu=0, \pm1, \pm2 \ldots, \Delta_3$ is the reciprocal of the contact ratio, then successively reducing the tool addendum height by grinding away small amounts of the order of 0.10 millimeter, until the tool produces correct gear tooth sides.

28. The method of making a finishing tool for finishing gears similar to each other, comprising the steps: first making a tool having a profile displacement corresponding, together with the dimensions of the gears to be finished, to the condition $\Delta_1 \approx 0.5+\nu/2\Delta_3$, the distance of action between the tool and the gears being by a small amount of the order of $0.25\ m$ greater than the distance of action between the gears and their mating counterparts, and with an addendum height which is by a small amount of up to 0.5 millimeter greater than the addendum height corresponding to the condition $\Delta_1=0.5+\nu/2\Delta_3$, where $\Delta_1=c/e$, $c$ is the distance between the middle of an even-numbered contact path section of the distance of action $e$ and the gear dedendum end of the distance of action $e$, $\nu=0, \pm1, \pm2 \ldots, \Delta_3$ is the reciprocal of the contact ratio, and $m$ is the module; then successively reducing the tool addendum height by small amounts of the order of 0.10 millimeter, until the tool produces correct gear tooth sides.

29. A gear-like or rack-like or worm-shaped finishing tool with accurate or modified involute teeth and a toothed workpiece set-up in a gear finishing machine, wherein the dimensions of said tool and said workpiece satisfy the following relation: $\Delta_1=c/e$ is approximately $0.5+\nu/2\Delta_3$, wherein $e$ designates the distance of action between said tool and workpiece, $c$ is the distance between the middle of an even-numbered contact path section of said distance of action and the workpiece dedendum end of the distance of action, $\nu=0, \pm1, \pm2 \ldots$, and $\Delta_3$ is the reciprocal of the contact ratio, and wherein the tool has an addendum height intermediate the addendum height corresponding to the relation $\Delta_1=0.5+\nu/2\Delta_3$ and to the last-mentioned addendum height plus 0.5 millimeter.

(References on following page)

References Cited by the Examiner
UNITED STATES PATENTS

| | | | |
|---|---|---|---|
| 1,168,402 | 1/16 | Lees | 29—103 |
| 2,249,252 | 7/41 | Mentley | 90—1.6 |
| 2,329,284 | 9/43 | Mentley | 29—103 |
| 2,338,528 | 1/44 | Miller | 90—1.6 |
| 2,354,670 | 8/44 | Drummond | 90—1.6 |
| 2,362,787 | 11/44 | Williamson | 90—1.6 |
| 2,403,492 | 7/46 | Boor | 74—462 |
| 2,594,186 | 4/52 | LeTourneau | 90—1.6 |
| 2,638,011 | 5/53 | Smith | 74—462 |

ANDREW R. JUHASZ, *Primary Examiner.*

LEON PEAR, *Examiner.*